US005111930A

United States Patent [19]

Ginzburg et al.

[11] Patent Number: 5,111,930

[45] Date of Patent: May 12, 1992

[54] NON-WARPING TABLE ROLLS

[75] Inventors: Vladimir B. Ginzburg, Pittsburgh; F. Ronald Vidil, McKeesport, both of Pa.

[73] Assignees: International Rolling Mill Consultants, Inc.; United Engineering, Inc., both of Pittsburgh, Pa.

[21] Appl. No.: 671,125

[22] Filed: Mar. 18, 1991

[51] Int. Cl.$^5$ .............. B65G 13/02

[52] U.S. Cl. .............. 198/780; 193/37; 29/110; 432/246

[58] Field of Search .............. 198/780; 193/37; 65/245, 253; 432/246; 29/110, 129.5, 130

[56] References Cited

U.S. PATENT DOCUMENTS

| | | | |
|---|---|---|---|
| 3,860,387 | 1/1975 | Bricmont | 432/246 |
| 4,722,212 | 2/1988 | Ginzburg et al. | 72/199 |
| 4,925,014 | 5/1990 | Haite | 198/780 |

*Primary Examiner*—D. Glenn Dayoan

*Attorney, Agent, or Firm*—Armstrong & Kubovcik

[57] ABSTRACT

A composite table roll for use in roll tables in metal rolling mills, particularly for handling hot metal workpieces, having a sleeve portion which is tightly secured to an underlying arbor only at the axial mid-portion so that the end-portions of the sleeve are not in contact with the arbor sufficient to cause any significant heat conductivity thereacross and the end-portions are free to thermally expand with reference to the arbor to thereby greatly minimize any thermal distortion of the arbor in the event a hot metal workpiece becomes stalled on the roll table.

14 Claims, 2 Drawing Sheets

NON-WARPING TABLE ROLLS

BACKGROUND OF THE INVENTION

1. Field of the Invention

This invention relates generally to rotating type table rolls used in roll tables for transferring metal workpieces, particularly hot metal workpieces, in metal processing plants such as rolling mills. More particularly, this invention relates to a simple and inexpensive composite table roll construction having thermal expansion characteristics sufficient to eliminate thermal warping and distortion which may cause binding and "freezing" of the roll bearings, and which additionally will minimize internal stresses which tend to reduce the overall roll life of composite table rolls.

2. Description of the Prior Art

In modern metal rolling mills, there are a variety of differing rolling processes and procedures for producing finished and semi-finished metal products. Typically, heated ingots, (steel or aluminum, for example) are hot rolled through one or more roll stands to semi-finished products such as slabs, blooms, or billets, which are subsequently further hot rolled through one or more roll stands to finished or semi-finished products, such as plates, structural products, bars, rods, hot strip and the like. Such roll stands generally comprise at least one pair of rolls between which the hot metal workpiece is passed to reduce and/or shape the hot metal workpiece as desired. As utilized herein, the term "hot metal workpiece" in intended to mean any hot metal being processed whether it be an ingot, slab, bloom, billet, plate, shape, bar, rod, hot strip or the like.

In addition to the roll stands which are utilized to reduce the hot metal workpiece to the desired cross-sectional thickness and configuration, numerous roll tables are provided and utilized to feed, receive, handle, transfer and hold the hot metal workpiece before, during and after the hot rolling operation. For example, there are feed tables to feed the hot metal workpiece to the roll stand, roll-out tables to receive the hot rolled metal workpiece from the roll stand, reversing tables to receive and return the hot rolled metal workpiece back to the roll stand, cooling tables where the hot rolled metal workpiece is permitted to cool, with and without water cooling, conveyer tables for merely conveying the hot metal workpiece from one point to another, furnace roll tables which support and convey the hot metal workpiece through a heating furnace prior to, or intermediate of, the hot rolling operations, as well as other such roll tables.

Typically, such roll tables comprise a plurality of horizontally disposed and parallel cylindrical rolls which are adapted to support the hot metal workpiece across the upper, parallel, cylindrical edge surface of the rolls, and convey the hot metal workpiece as desired by virtue of the uniformly rotating rolls. Accordingly, most roll tables are provided with a drive means, such as a plurality of electric motors, for causing the rolls to rotate as desired to convey the finished or unfinished hot metal workpiece.

The rolls which are utilized to make up a roll table typically comprise a solid, one piece cylindrical roll, or a one piece arbor provided with a hard protective roll sleeve, rotatably mounted within a bearing at each end, with one end drivably secured to the drive means, such as an electric motor. The table rolls are horizontally positioned in a closely spaced parallel alignment, and are usually water cooled from the under side by a plurality of water sprays, or internally cooled by water passageways within the body or arbor of the roll.

Since it is normally intended that the hot metal workpiece be in motion while on the roll table, the table rolls are normally heated and cooled in a relatively uniform manner by virtue of the fact that the table rolls are in constant rotation thereby heating and cooling the circumferential surfaces in a rather uniform manner. Most prior art table rolls utilized for handling hot metal workpieces are designed to accommodate for any such axial thermal expansion that may result. However, should the hot metal workpiece become stalled while on a roll table, as does frequently happen, either intentionally or accidently for a variety of reasons, the rolls very quickly become heated in a non-uniform manner. Specifically, when a hot metal workpiece is stalled and sits motionless on the roll table for even a very short period of time, the top portion of the rolls become excessively heated, to create a significant thermal gradient from the top to the bottom portion of the rolls. If water cooling is continued, the thermal gradient can become even more excessive. Such non-axial thermal gradients within the rolls will cause the heated upper portions to expand significantly, while the bottom portions may in fact even shrink and contract. This excessive non-uniform expansion will normally cause the rolls to bow upward by virtue of the excessive expansion in the upper portions, with the result that the bowed distortion will cause the journaled ends of the rolls to bind-up within the bearings and even "freeze" within the bearings so that the rolls cannot thereafter be rotated. Such a situation may not only require rather time consuming corrective measures, such as removing the hot metal workpiece to permit the rolls to cool to a more uniform temperature, but may further require maintenance work on the bearings and/or rolls.

SUMMARY OF THE INVENTION

This invention is predicated upon a new and improved table roll design intended to overcome the above-noted disadvantages which will significantly minimize any tendency for the table roll to warp or bow when a hot workpiece is in a "stall" condition as described above. The table roll construction of this invention comprises a composite roll having an outer sleeve fitted over a roll arbor, as is conventional in prior art practice. Pursuant to this invention, however, the sleeve is very tightly fitted, such as shrink fitted, to the arbor only at the axial mid-portion of the assembly so that both end-portions of the sleeve do not contact the arbor at all, or are in contact with the arbor only with a minimum of contact pressure, so that the free ends of the sleeve do not cause any appreciable heat transfer by virtue of heat conductivity to the arbor ends, and are also free to expand axially or circumferentially independent of the arbor to thereby minimize any stresses the sleeve ends may impose on the arbor as a result of their thermal expansion. As a result, any non-uniform heating of the arbor is primarily limited to only the mid-portion so that the thermal and physical forces imposed on the arbor are not significant enough to cause any bowing of the arbor or roll. This, of course, will serve to eliminate or minimize any damage to the bearings, and eliminate or minimize the possibility of freezing of the arbor ends within the bearings.

In a preferred embodiment of this invention, the end-portions of the composite roll; i.e., the axial end-portions of the arbor and sleeve, are spaced apart sufficiently to provide a chamber between the sleeve ends and arbor ends into which a coolant such as water can be directed to even further minimize the possibility of non-uniform thermal expansion of the roll arbor. Accordingly, in a "stall" condition whereby a hot metal workpiece will significantly heat the upper surface of the sleeve, a moderate amount of heat may indeed be transferred to the mid-portion of the arbor via conduction, but the end-portions of the sleeve do not contact the arbor with any significant pressure as will cause appreciable heat transfer by virtue of conductivity, particularly if the sleeve ends are spaced from the arbor and the arbor ends are independently water cooled. In addition, the heated portion of the sleeve end-portions are free to expand independent of the arbor without the sleeve end-portions causing any stresses on the arbor.

While it should be recognized that composite table rolls have been utilized extensively in the prior art, such prior art composite table rolls utilize sleeves which are tightly fitted (i.e., shrink fitted) onto the arbor throughout the entire axial length of the cylindrical surface. As a result of differential thermal expansion between the sleeve and the arbor, even if purely linear, significant internal stresses are created which tend to loosen the interface bond and cause minute cracking of the sleeve. This rather normal result adversely affects the overall life of the roll. In view of the fact that the table rolls of this invention provide a sleeve that is tightly fitted onto the arbor only at the mid-portion, it has been found that even in the absence of "stall" conditions, the internal stresses resulting from differential thermal linear expansions are greatly reduced, which thereby significantly increases the roll life even under normal operating conditions.

DETAILED DESCRIPTION OF THE INVENTION

Figure 1:
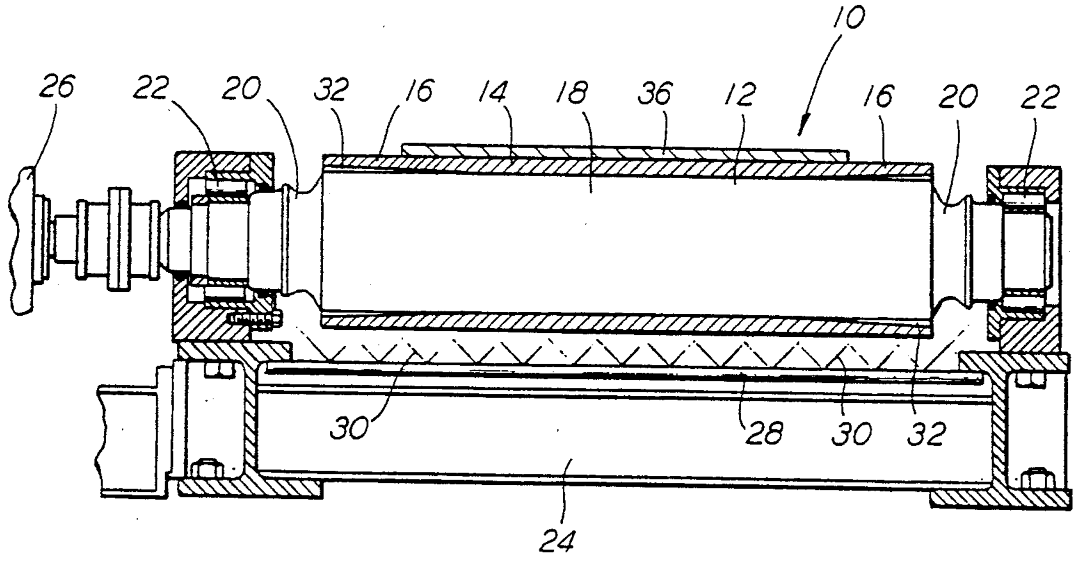
FIG. 1 is a cross-sectional elevation of a table roll in accordance with one embodiment of this invention illustrating a sleeve tightly secured to a roll arbor, whereby the ends of the sleeve are not in contact with the arbor thereby providing an open chamber between the sleeve ends and arbor.

Reference to FIG. 1 will illustrate one rather basic embodiment of a table roll 10 of this invention which comprises an arbor 12 having a sleeve 14 around its cylindrical roller portion. As in more or less conventional roll tables, the arbor 12 comprises a cylindrical body portion 18, an axle shaft 20 at each end, each of which is journaled through roller bearing 22 rigidly mounted to a frame structure 24. One of the axle shafts 20 is secured to a drive means 26, such as an electric motor, for rotating the roll 10. Again as in normal practice, it would be customary to provide a water manifold 28 along the underside of roll 10 having nozzles (not shown) in the upper surface for spraying water, or other coolant, to the underside of the table roll 10, as graphically depicted by the conical spray lines 30.

Pursuant to conventional practice, the sleeve 14 must be very tightly secured onto cylindrical body 18 of arbor 12 by any means such as shrink-fitting. A very tight fitting is essential in order to prevent any slippage between the arbor and sleeve which would obviously be detrimental to the roll's ability to move the hot metal workpiece thereon. Pursuant to one such technique, the sleeve is provided with a slightly smaller internal diameter than the outer diameter of the cylindrical portion of the arbor and then heated to a temperature where it has expanded sufficiently to permit it to be fitted over the arbor cylinder, and then allowed to cool, and shrink tightly compressed onto the arbor. Pursuant to the practice of this invention, however, sleeve 14 is tightly fitted onto only the mid-portion of the cylindrical body 18 of arbor 12, so that when fitted, the end-portions 16 of the sleeve 14 do not come into contact with cylindrical body portion 18 of arbor 12, or contact it only very lightly, without applying any compressive force. Therefore, the heat transfer across this non-contacting or lightly contacting interface will be at a minimum, and in addition the end-portions 16 of sleeve 14 will be free to expand thermally without binding against cylindrical body 18 of arbor 12.

One technique for achieving a fitting as described above is illustrated in FIG. 1 whereby the mid-portion of sleeve 14 has a smaller inside diameter than do the end-portions 16. In contrast thereto, the cylindrical body 18 of arbor 12 is provided with a uniform outside diameter which is larger than the inside diameter of the sleeve 14 at the mid-portion, but smaller than the inside diameter of the sleeve end-portions 16. Accordingly, when sleeve 14 is shrink-fitted onto body 18, only the mid-portion of sleeve 14 will engage body 18, while the end-portions 16 will be spaced from body 18, to provide a tapered annular chamber 32 at each end between each sleeve end portions 16 and cylindrical body 18 of arbor 12 as shown.

It should be appreciated that other sleeve and arbor section designs can be utilized to achieve the same result, such as a sleeve having a uniform inside diameter fitted onto an arbor having a larger diameter at the mid-section, or interposing an intermediate member at the mid-portion such as a thin band. In a like manner, it is not necessary that the sleeve end portions 16 have tapered surfaces as illustrated, but may comprise a cylindrical surface uniformly spaced from the arbor, thus defining a non-tapered annular chamber. The tapered surface as shown in FIG. 1 is preferred, however, for the purpose of avoiding any re-entrant angles or stress risers which could lead to troublesome stresses if there were a sharp change in diameters between the mid and end-portions.

While there is no critical limit regarding the exact location between the mid and end-portions, the benefits of the invention will be maximized by minimizing the area of tight contact and maximizing the area of no contact. Obviously, the tightly bonded mid-portion should not be so small that the sleeve would tend to pivot about the mid-portion should an end-portion become heavily loaded. For practical applications, therefore, it is preferred that the tight, shrink fitted portion comprise no more than 70 percent and no less than 30 percent of the axial length of the cylindrical body, and preferably about only 45 percent of the axial length of the cylindrical body.

It should be readily apparent that when the above-described table roll is utilized in normal service and a hot metal workpiece 36 is in contact with the upper surface of sleeve 14, the sleeve 14 will be heated and caused to expand, while at the same time causing heat transfer to arbor 12. If the hot metal workpiece 36 is in motion as normally intended, with table roll 10 in revolving motion, sleeve 14 and arbor 12 will be heated by hot metal workpiece 36 and cooled by sprays 30 in a rather uniform manner, so that any thermal expansion will primarily be a linear expansion in the axial direction, which can be compensated for pursuant to prior art practices, (e.g., by designing the axle shafts to expand axially through roller bearings 22). In the event of a "stall" situation, however, and the hot metal workpiece 36 and sleeve 14 are not in motion, the upper side of the sleeve 14, in contact with hot metal workpiece 36, will become excessively heated in contrast to the lower and side portions. Indeed, the hot upper portion of the sleeve 14 will conduct some of that heat to the upper portion of the arbor 12. However, only the mid-portion of cylindrical body 18 will be excessively heated along the upper surface, while the end-portion spaced below sleeve end portions 16 will not be excessively heated. By virtue of this rather limited non-uniform heating of the arbor 12, there will be a greatly reduced tendency for the arbor 12 to undergo any significant non-uniform thermal expansion and bowing as may cause binding or "freezing" within the bearings 22.

Also, by use of the arrangement of the present invention, differences between the coefficient of expansion of an arbor and the coefficient of expansion of the sleeve would not cause as much of a problem as is found in prior art table rolls.

Figure 2:
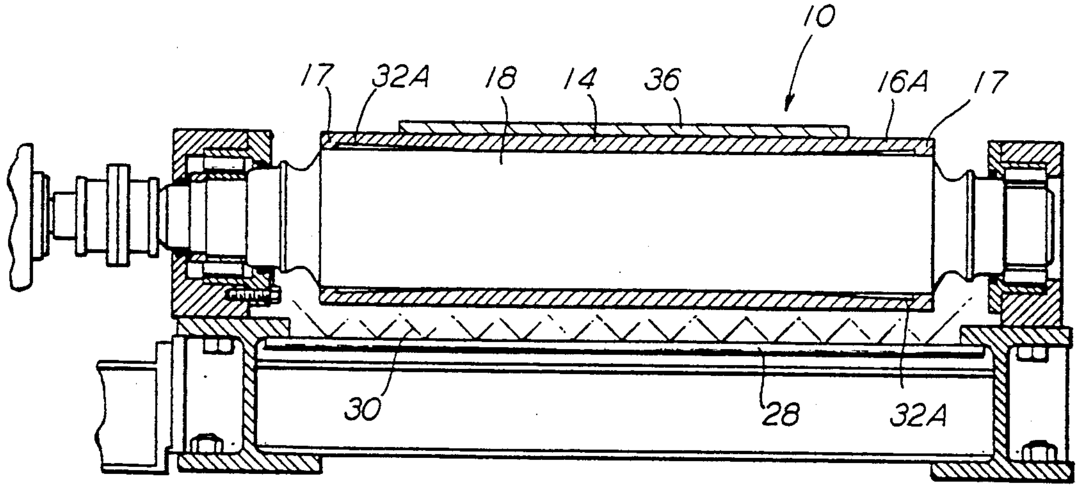
FIG. 2 is identical to FIG. 1 except that it illustrates a roll sleeve in which the extreme sleeve ends are provided with an inwardly extending flange in minimal contact with the arbor to achieve a closed chamber.

Reference to FIG. 2 will illustrate another embodiment of this invention which is substantially the same as the above described embodiment except for the fact that extreme ends of sleeve 16A are provided with an inwardly extending flange 17 designed to close tapered annular chambers 32A. The inside diameter of flanges 17 should be somewhat greater than the outside diameter of cylindrical body 18 so that flanges 17 will be free to slide axially over the surface of cylindrical body 18 as if there were no contact. While the heat transfer and thermal expansion characteristics of this embodiment are substantially the same as those of the embodiment described above, this embodiment will provide some degree of sleeve support at the extreme ends thereof as may be desired to minimize the possibility of load stresses on the sleeve 14 when very heavy hot metal workpieces are being supported by the rolls.

Figure 3:
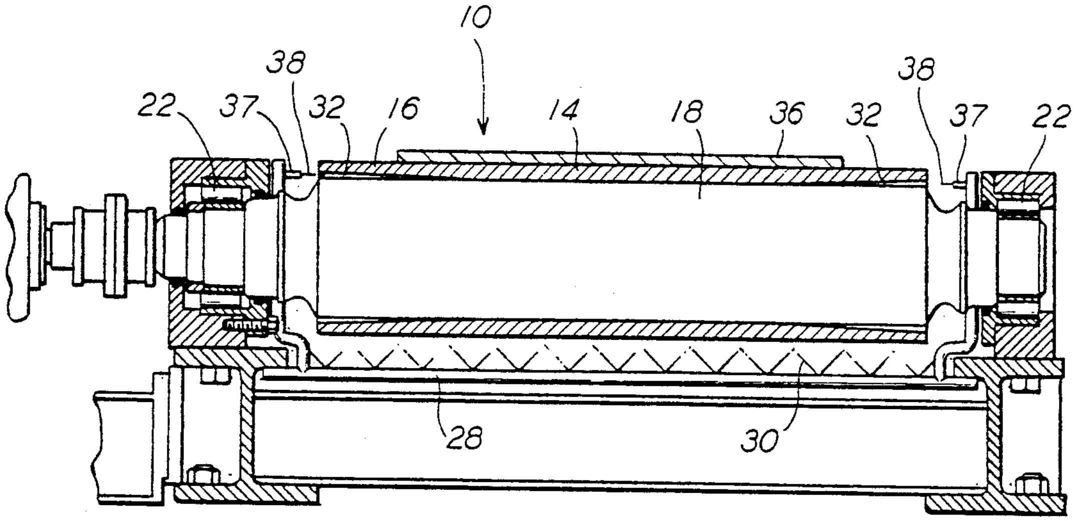
FIG. 3 is identical to FIG. 1 except that it illustrates an embodiment utilizing coolant sprays to cool the exposed arbor surface within the open chamber.

Reference to FIG. 3 will illustrate another application of this invention which utilizes the same embodiment as that described with reference to FIG. 1. Here, the table roll 10 as previously-described, is provided with cooling spray nozzles 37 to direct a water or other coolant spray 38 into the annular chambers 32. By water cooling the annular chambers 32 the amount of heat transfer from the sleeve end portions 16 to the underlying arbor is even further minimized, thereby further reducing the probability for any thermal distortion of arbor 12 sufficient to cause bowing and "freezing" of the axle shaft 20 within the bearings 22.

Figure 4:
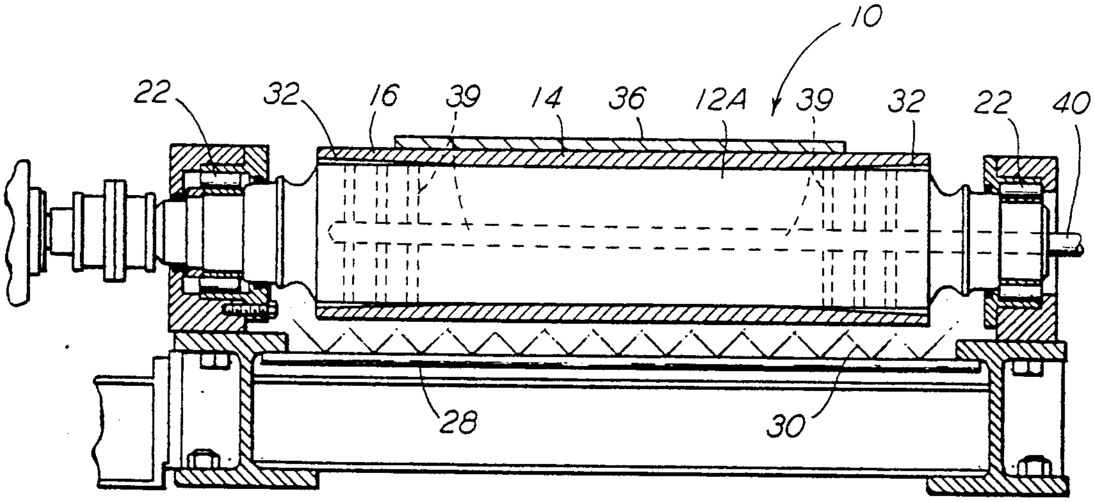
FIG. 4 is identical to FIG. 2 except that it illustrates an embodiment utilizing coolant passageways within the arbor to cool the arbor surface within the closed chamber.

Reference to FIG. 4 will illustrate still another application of this invention which again utilizes the same embodiment as that described with reference to FIG. 1. Here, the table roll 10 as previously-described, is provided with coolant channels 39 within the arbor 12A for directing water, or other coolant, from a source (not shown) through an inlet conduit 40, and then through coolant channels 39, to the annular chambers 32. Here again, by water cooling the chambers 32 the amount of heat transfer from the sleeve end portions 16 to the underlying arbor 12A is further minimized, thereby further reducing the probability for any thermal distortion and bowing of arbor 12A and "freezing" of the axle shaft within the bearings 22.

In view of the above described embodiments of this invention it should be readily apparent that numerous modifications and different embodiments can be utilized without departing from the spirit of the invention. As already noted, several different arbor and sleeve geometries have been discussed which will permit tight bonding of the sleeve and arbor at the mid-portions without allowing contact at the end-portions. For example, one can utilize the liquid coolant system as described with reference to FIG. 4 in combination with the table roll as depicted in FIG. 2, having a closed annular chamber 32A. Since a coolant would be directed into the "closed" annular chamber 32A in this application, the space between flanges 17 and cylindrical body 18 will have to be sufficient to permit the coolant to egress between flanges 17 and arbor 12A.

What is claimed is:

1. A table roll for use in roll tables comprising; an arbor having a generally cylindrical body, and a sleeve having a mid-portion and two end-portions fitted onto said cylindrical body, said sleeve being tightly fitted to said cylindrical body only at said mid-portion and said end-portions are sufficiently free of any tight fitting onto said cylindrical body to minimize any heat transfer from said end-portions of said sleeve to said cylindrical body and permit said end-portions of said sleeve to undergo thermal expansion independent of said cylindrical body.

2. A table roll as defined in claim 1, in which said sleeve end-portions are spaced from said cylindrical body sufficient to provide a chamber between each end-portion and said cylindrical body.

3. A table roll as defined in claim 2, in which said sleeve end-portions are provided with inwardly extending flanges, said flanges sufficiently free of any tight fitting onto said cylindrical body to permit said end-portion to undergo thermal expansion independent of said cylindrical body, and reducing any heat transfer from said end-portions to said cylindrical body.

4. A table roll as defined in claim 1, in which said sleeve is shrink fitted to said cylindrical body only at said mid-portion.

5. A table roll as defined in claim 4, wherein said mid-portion comprises b between 30 to 70 percent of the axial length of said sleeve.

6. A table roll as defined in claim 3, in which said sleeve is shrink fitted to said cylindrical body only at said mid-portion.

7. A table roll as defined in claim 6, wherein said mid-portion comprises between 30 to 70 percent of the axial length of said sleeve.

8. A roll table for use in supporting hot metal workpieces comprising a plurality of table rolls, at least one of said table rolls having a generally cylindrical body and a sleeve having a mid-portion and two end-portions fitted onto said cylindrical body, said sleeve being tightly fitted to said cylindrical body only at said mid-portion and said end-portions are sufficiently free of any tight fitting onto said cylindrical body to permit said end-portions to undergo thermal expansion independent of said cylindrical body, and reducing heat transfer from said end-portions to said cylindrical body.

9. A roll table as defined in claim 8, wherein said end-portions of said sleeve, of said at least one table roll, are spaced from said cylindrical body sufficient to provide a chamber bet ween each end-portion and said cylindrical body.

10. A roll table as defined in claim 9, further comprising means for introducing a coolant into each said chamber.

11. A roll table as defined in claim 10, wherein said means comprises at least one nozzle for directing coolant into each said chamber.

12. A roll table as defined in claim 11, wherein said means comprises coolant passageways within said cylindrical body for directing coolant into each said chamber.

13. A roll table as defined in claim 8, wherein said mid-portion comprises between about 30 to 70 percent of the axial length of said sleeve.

14. A roll table as defined in claim 8, wherein each of said table rolls has a generally cylindrical body and a sleeve having a mid-portion and two end-portions fitted onto said cylindrical body, said sleeve being tightly fitted to said cylindrical body only at said mid-portion and said end-portions are sufficiently free of any tight fitting onto said cylindrical body to permit said end-portions to undergo thermal expansion independent of said cylindrical body, and reducing heat transfer from said end-portions to said cylindrical body.

* * * * *